United States Patent
Damaraju et al.

(10) Patent No.: US 7,710,996 B1
(45) Date of Patent: May 4, 2010

(54) PROGRAMMABLE SYSTEMS AND METHODS FOR WEIGHTED ROUND ROBIN ARBITRATION

(75) Inventors: Ravi K. Damaraju, Sunnyvale, CA (US); David James Ofelt, Redwood City, CA (US); David Ross Skinner, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1502 days.

(21) Appl. No.: 10/227,835

(22) Filed: Aug. 27, 2002

(51) Int. Cl.
*H04L 12/43* (2006.01)
*H04J 3/02* (2006.01)

(52) U.S. Cl. ........................ 370/461; 370/462
(58) Field of Classification Search ............... None
See application file for complete search history.

(56) References Cited

U.S. PATENT DOCUMENTS

| | | | | | |
|---|---|---|---|---|---|
| 3,987,248 | A | * | 10/1976 | Platet et al. | 370/506 |
| 4,196,315 | A | * | 4/1980 | Boutmy et al. | 370/506 |
| 4,271,505 | A | * | 6/1981 | Menot et al. | 370/400 |
| 4,807,221 | A | * | 2/1989 | Stummer | 370/523 |
| 5,673,253 | A | * | 9/1997 | Shaffer | 370/229 |
| 5,748,629 | A | * | 5/1998 | Caldara et al. | 370/389 |
| 5,787,086 | A | * | 7/1998 | McClure et al. | 370/413 |
| 5,818,841 | A | * | 10/1998 | Shen | 370/395.21 |
| 5,835,498 | A | * | 11/1998 | Kim et al. | 370/537 |
| 5,912,889 | A | * | 6/1999 | Preas et al. | 370/359 |
| 5,949,789 | A | * | 9/1999 | Davis et al. | 370/452 |
| 5,956,342 | A | * | 9/1999 | Manning et al. | 370/414 |
| 6,023,471 | A | * | 2/2000 | Haddock et al. | 370/426 |
| 6,215,795 | B1 | * | 4/2001 | Chauhan | 370/473 |
| 6,542,518 | B1 | * | 4/2003 | Miyazawa | 370/468 |
| 6,594,271 | B1 | * | 7/2003 | Wu et al. | 370/412 |
| 6,813,284 | B2 | * | 11/2004 | Vayanos et al. | 370/537 |
| 2003/0081631 | A1 | * | 5/2003 | Liu et al. | 370/468 |

* cited by examiner

*Primary Examiner*—Ayaz R Sheikh
*Assistant Examiner*—Blanche Wong
(74) *Attorney, Agent, or Firm*—Harrity & Harrity, LLP

(57) ABSTRACT

An arbiter system may include a first arbiter, a second arbiter, and selection logic. The first arbiter may be configured to select a first data identifier from among a group of data identifiers that are associated with a first bandwidth. The second arbiter may be configured to select a second data identifier from among another group of data identifiers that are associated with a second bandwidth. The selection logic may be configured to periodically select the first data identifier and the second data identifier so that the first data identifier and the second data identifier are respectively selected in proportion to the first bandwidth and the second bandwidth.

10 Claims, 9 Drawing Sheets

PROGRAMMABLE SYSTEMS AND METHODS FOR WEIGHTED ROUND ROBIN ARBITRATION

BACKGROUND OF THE INVENTION

1. Field of the Invention

The invention relates generally to data processing, and more particularly, to arbitration among units of data.

2. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands.

To meet the new demands, purpose-built routers have been designed with components optimized for routing. These routers not only handle higher line rates and higher network traffic volume, but they also add functionality without compromising line rate performance.

A purpose-built router may include a number of input and output ports from which it transmits and receives packets. The packets may arrive and depart on a number of associated channels. The channels of data may have different bandwidths associated with them, and purpose-built routers may process data based on these channel bandwidths.

It may be desirable to perform weighted arbitration for access to a "shared resource" among units of data (more generically, "requesters" of the shared resource) according to channel bandwidths associated with the units of data. For example, a first group of data (e.g., from a first channel) may have a first associated bandwidth and a second group of data (e.g., from a second channel) may have a second associated bandwidth. It may be desirable to arbitrate fairly (i.e., round robin) within the two groups of data, but to output data from the two groups in proportion to their bandwidths. If the first bandwidth is twice the second bandwidth, for example, units of data from the first group should be output twice as often as units of data from the second group.

FIG. 1 is a diagram illustrating an arbiter 100 for performing weighted round robin arbitration among data units according to channel bandwidths associated with the data units. Arbiter 100 may include a table 110 and a counter 120. Table 110 may contain all data to be arbitrated among. Data associated with higher-bandwidth channels may be distributed more frequently throughout table 110. For example, data units from a channel with a bandwidth ten times greater than that of another channel may appear ten times as often in the table as data units from the other channel. To ensure fair arbitration among data units associated with a given channel bandwidth, those data units should be uniformly spaced throughout table 110.

Counter 120 may be configured to sequentially step through table 110 at periodic intervals and cause data at the current location to be output. When counter 120 reaches the end of table 110, it may begin traversing table 110 at the other end. Such a sequential traversal of table 110 results in fair (i.e., round robin) arbitration among the elements in table 110. Causing the data to be distributed throughout table 110 with a frequency proportional to its channel bandwidth results in a weighting of the arbitration outputs according to their associated channel bandwidths.

The size and complexity of arbiter 100 shown in FIG. 1, however, may increase with both the number of different bandwidths and the ratio of the highest bandwidth to the lowest bandwidth. For example, if this ratio is 50, then fifty elements in table 110 would be needed for the higher bandwidth channel to every one element for the lower bandwidth channel.

Thus, there exists a need for a weighted arbiter that efficiently handles data at a number of different bandwidths and ratios of bandwidths.

SUMMARY OF THE INVENTION

Systems and methods consistent with the principles of the invention may provide, among other things, a weighted arbiter that efficiently handles data at a number of different bandwidths and ratios of bandwidths.

In accordance with one purpose of the invention as embodied and broadly described herein, an arbitration device for selecting a requestor for access to a resource may include a first arbiter configured to select a first requestor from among a first group of requestors that are associated with a first requestor characteristic. A second arbiter may be configured to select a second requestor from among a second group of requestors that are associated with a second requestor characteristic. A third arbiter may be configured to choose between the first requestor and the second requestor based on the first requestor characteristic and the second requestor characteristic.

In another implementation consistent with the principles of the invention, a weighted arbiter for controlling access to a resource by requestors may include a first arbiter configured to select a first requestor. The first arbiter may be associated with a first bandwidth. A second arbiter may be configured to select a second requester. The second arbiter may be associated with a second bandwidth different from the first bandwidth. First arbiter logic may be configured to choose between the first requestor and the second requestor to produce a chosen requester. A frequency with which the first arbiter logic chooses the first requestor as the chosen requester may depend on the first bandwidth and the second bandwidth.

In a further implementation consistent with the principles of the invention, a system for selecting units of data may include a first arbiter configured to select a first data identifier from among a group of data identifiers that are associated with a first bandwidth. A second arbiter may be configured to select a second data identifier from among another group of data identifiers that are associated with a second bandwidth. Logic may be configured to periodically select one of the first data identifier and the second data identifier so that the first data identifier and the second data identifier are respectively selected in proportion to the first bandwidth and the second bandwidth.

In yet another implementation consistent with the principles of the invention, a method for performing weighted arbitration may include grouping requestors into a number of groups of requestors so that each group of requestors is associated with a different bandwidth. A requestor may be selected from each of the groups of requestors to produce a number of selected requestors. A final requestor may be periodically chosen from the number of selected requesters so that the final requester is chosen from each of the groups of requesters with a frequency that is proportional to the respective different bandwidth associated with each of the groups of requestors.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

As described herein, weighted arbitration may be performed on different groups of requestors having different characteristics, such as bandwidths. The arbiter system may service requesters from the different groups with frequencies that are proportional to the bandwidths associated with the different groups.

Exemplary System Configuration

Figure 1:
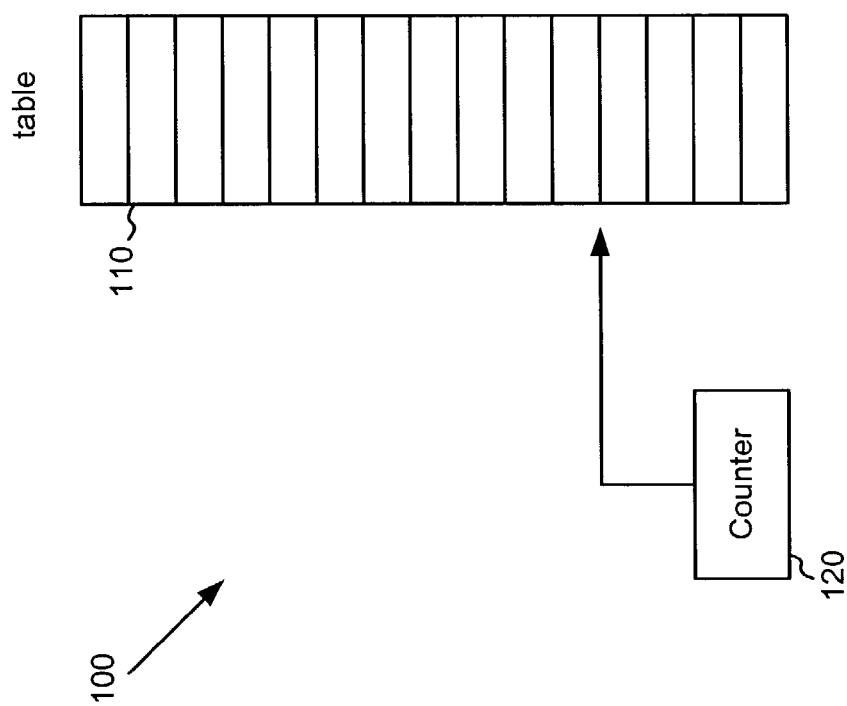
FIG. 1 is a diagram illustrating an arbiter for performing weighted round robin arbitration.
Figure 2:
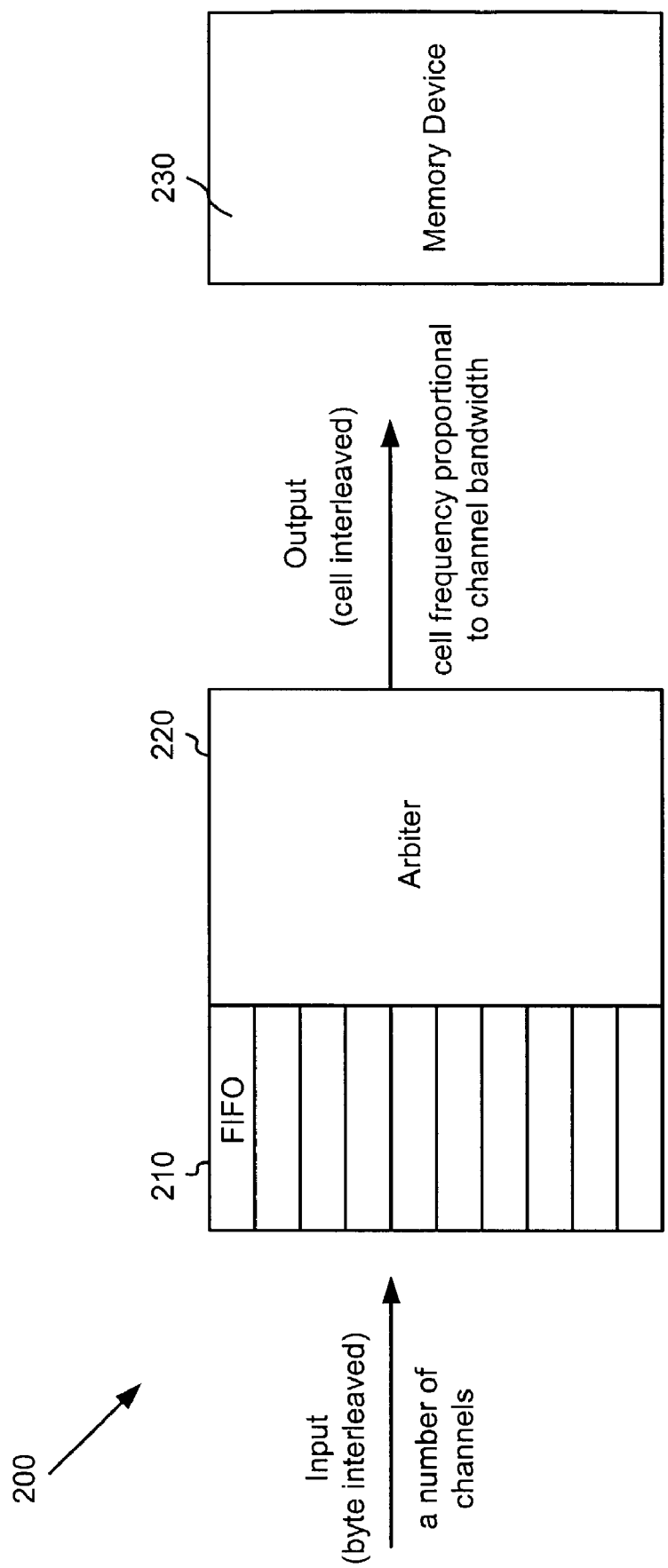
FIG. 2 is a system in which an arbiter consistent with the principles of the invention may be implemented.

FIG. 2 is a diagram of a system 200 in which an arbiter consistent with the principles of the invention may be implemented. System 200 may be included in a network device that receives packets of data on a number of channels, where each channel has an associated bandwidth. The packets of data may be formed into a number of units of data (called "cells") by appropriate hardware (not shown). A cell of data may be, for example, 64 bytes in length. The cells of data may be transferred to a memory device 230 by system 200 while, for example, route processing and/or other processing is performed. System 200 may be configured to receive the cells of data in byte-interleaved format, and to output the cells to memory device 230 in cell-interleaved format, where the frequency at which a channel's cells are output is proportional to the bandwidth of that channel.

System 200 may include a number of buffers, such as first-in first-out (FIFO) queues 210, an arbiter 220, and memory device 230. FIFO queues 210 may be configured to store cells of data. One or more FIFO queues 210 may correspond to an input channel. These FIFO queues 210 may be implemented by a memory device, such as a random access memory (RAM).

Arbiter 220 may be configured to choose cells from among the cells at the heads of FIFO queues 210 to output. Arbiter 220 may be implemented using hardware (e.g., an application-specific integrated circuit (ASIC)), software, or some combination of both. Arbiter 220 may be configured to operate on identifiers of the cells at the heads of FIFO queues 210 so that cells are output in proportion to the bandwidth of their input channel.

Conceptually, arbiter 220 controls access to the "shared resource" of memory device 230, and the cells are "requesters" of that resource, even though the cells may not actively request anything. Their presence at the head of a FIFO queue 210 serves as an implicit request to be sent to memory device 230. Arbiter 220 may not operate on the requesters (i.e., cells) themselves, but rather on "requester identifiers (IDs)" that correspond to the cells. When a requestor ID is chosen by arbiter 220, the corresponding cell in a FIFO queue 210 may be sent to, for example, memory device 230.

It should be noted that system 200 is but one example of where arbiter 220 may be used. Another exemplary location for arbiter 220 may be after route lookup processing, when the cells in memory device 230 are reassembled into packets. In such a configuration, arbiter 220 may control access to the "shared resource" of one or more packet assemblers. Arbiter 220 sends cells to a packet assembler with a frequency proportional to the bandwidth of an output channel of the cells. Those skilled in the art will appreciate other environments where arbiter 220 may be used.

Exemplary Arbiter System

Figure 3:
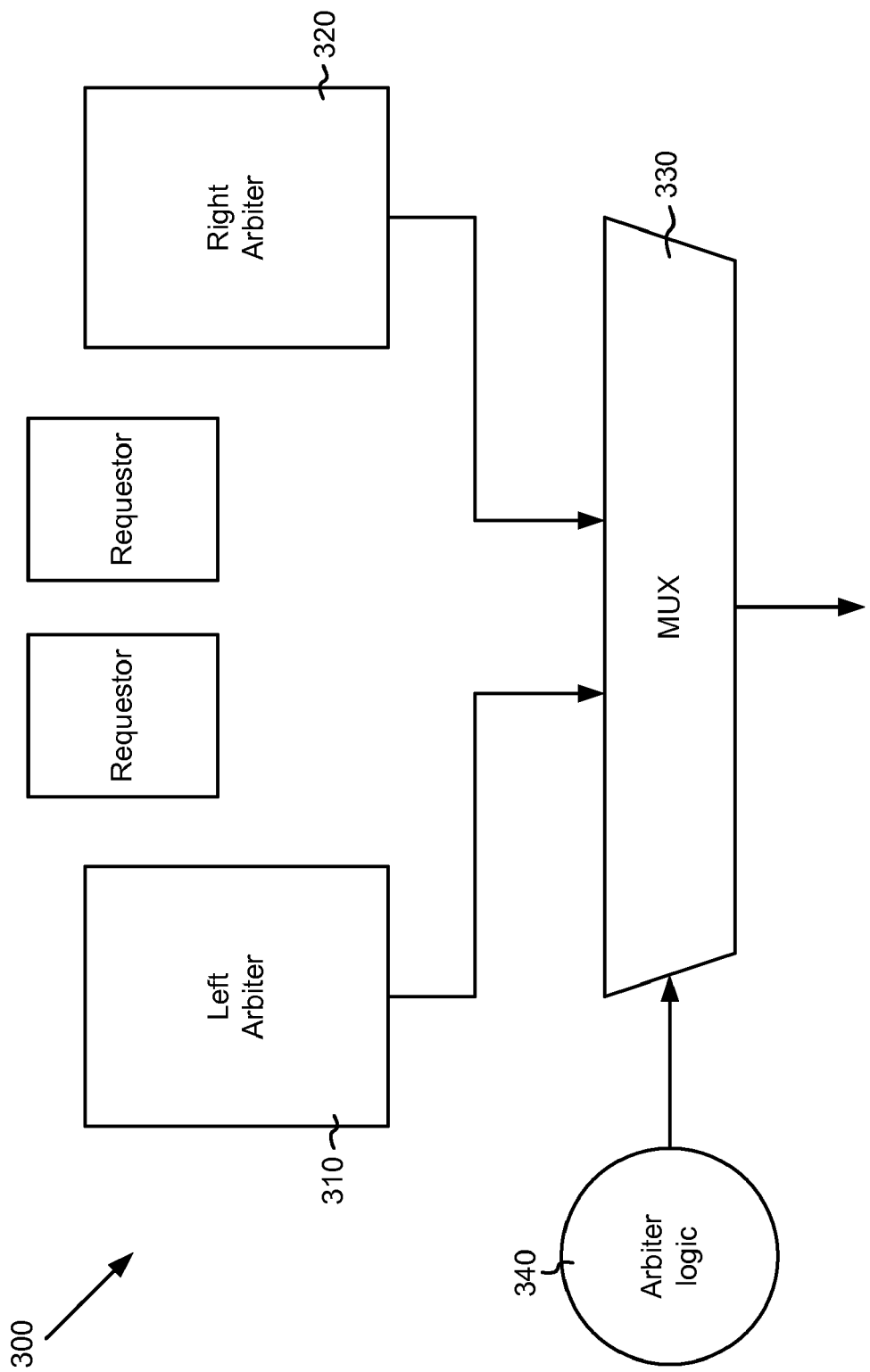
FIG. 3 is a diagram illustrating an arbiter system consistent with the principles of the invention.

FIG. 3 is a diagram illustrating an arbiter system 300 consistent with the principles of the invention. Arbiter system 300 may be one implementation of arbiter 220 in FIG. 2. Arbiter system 300 may include a left arbiter 310, a right arbiter 320, a multiplexer (MUX) 330, and arbiter logic 340. Arbiter system 300 is referred to as a "system," because it includes and uses left and right arbiters 310 and 320 to produce its result.

Left arbiter 310 and right arbiter 320 may be similar in function, and will be discussed together. Left arbiter 310 and right arbiter 320 may be configured to independently choose among two different sets of requestor IDs to produce a respective "left result" and "right result." In a preferred implementation, left arbiter 310 and right arbiter 320 both may be round robin arbiters, but other implementations (e.g., linear arbiters, etc.) are possible.

Left arbiter 310 may be configured to arbitrate among requestor IDs that are all associated with a first bandwidth. Thus, left arbiter 310 may choose resources fairly (e.g., in a round robin manner) among all resources associated with the first bandwidth. Similarly, right arbiter 320 may be configured to arbitrate among requestor IDs that are all associated with a second bandwidth that is different from the first bandwidth. Thus, the right arbiter 320 may choose resources fairly (i.e., in a round robin manner) among all resources associated with the second bandwidth.

Figure 4:
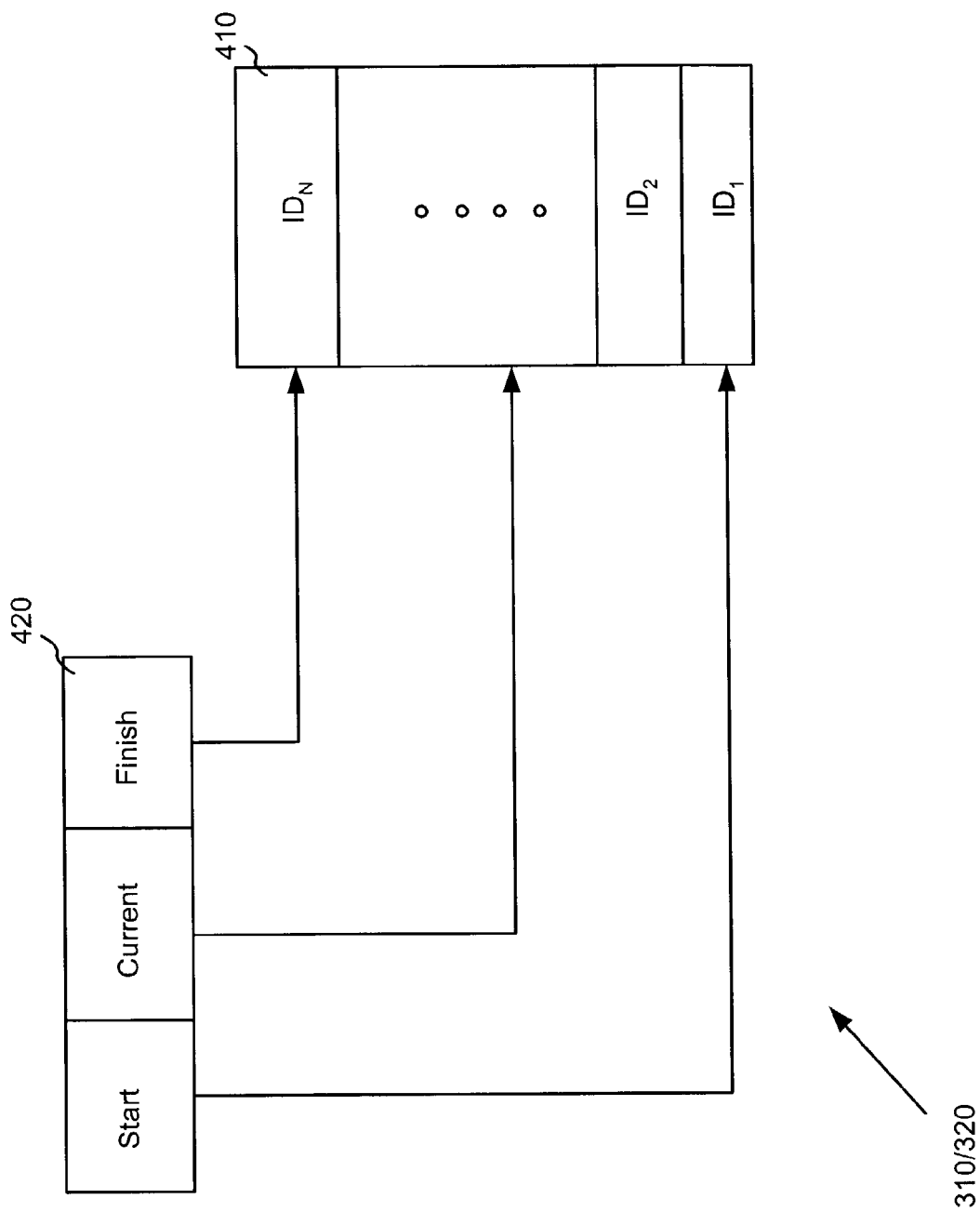
FIG. 4 is a detailed diagram of an arbiter in the arbiter system of FIG. 3.

FIG. 4 is a diagram illustrating in greater detail an implementation of one of arbiters 310 and 320. Arbiter 310/320 may include a storage element 410 and a number of pointers 420 to storage element 410.

Storage element 410 may be configured to store a number of requestor IDs (i.e., $ID_1, ID_2, \ldots, ID_N$) that correspond to the same bandwidth. For example, each of $ID_1, ID_2, \ldots, ID_N$ may be associated with a different channel $1, 2, \ldots, N$. Each of the channels may have a bandwidth of X. In this sense, $ID_1, ID_2, \ldots, ID_N$ all "correspond to" or are "associated with" the same bandwidth, X. Storage element 410 may be implemented as a register or a block of elements within a memory device (e.g., RAM).

Pointers 420 may include a start pointer, an end pointer, and a current pointer. The start pointer and the end pointer define a region in storage element 410 in which the requester IDs (i.e., $ID_1, ID_2, \ldots, ID_N$) reside. The current pointer identifies the requester ID of the requestor currently being serviced. This "current requestor ID" is output by arbiter 310/320 shown in FIG. 4. The current pointer may be incremented after the current request is serviced (e.g., after the cell corresponding to the serviced requestor ID is output from the queue 210), and the current pointer may wrap around to the start pointer after reaching the end pointer.

Returning to FIG. 3, multiplexer 330 may be configured to output one of the outputs from left arbiter 310 and right arbiter 320 based on a control signal from arbiter logic 340. Those skilled in the art will recognize that MUX 330 may be implemented using hardware, software, or a combination of hardware and software. For example, in one implementation consistent with the principles of the invention, MUX 330 may be implemented as a call by arbiter logic 340 to the portion of storage element 410 (FIG. 4) identified by the current pointer. Such a call may return the requestor ID at the location denoted by the current pointer.

Arbiter logic 340 may be configured to choose between the outputs of left arbiter 310 and right arbiter 320 and to instruct MUX 330 to implement its choice. Arbiter logic 340 may choose in a weighted manner, so that the output from left arbiter 310 is chosen in proportion to the first bandwidth associated with its requestor IDs. Similarly, arbiter logic 340 may choose such that the output from right arbiter 320 is chosen in proportion to the second bandwidth associated with its requestor IDs. For example, if the second bandwidth associated with right arbiter 320 is three times as large as the first bandwidth associated with left arbiter 310, the arbiter logic 340 will choose the requester ID output from right arbiter 320 three times as often as than the requestor ID output from left arbiter 310. Arbiter logic 340 in conjunction with MUX 330 may output a new requestor ID at a fixed rate (e.g., every T clock cycles).

Figure 5:
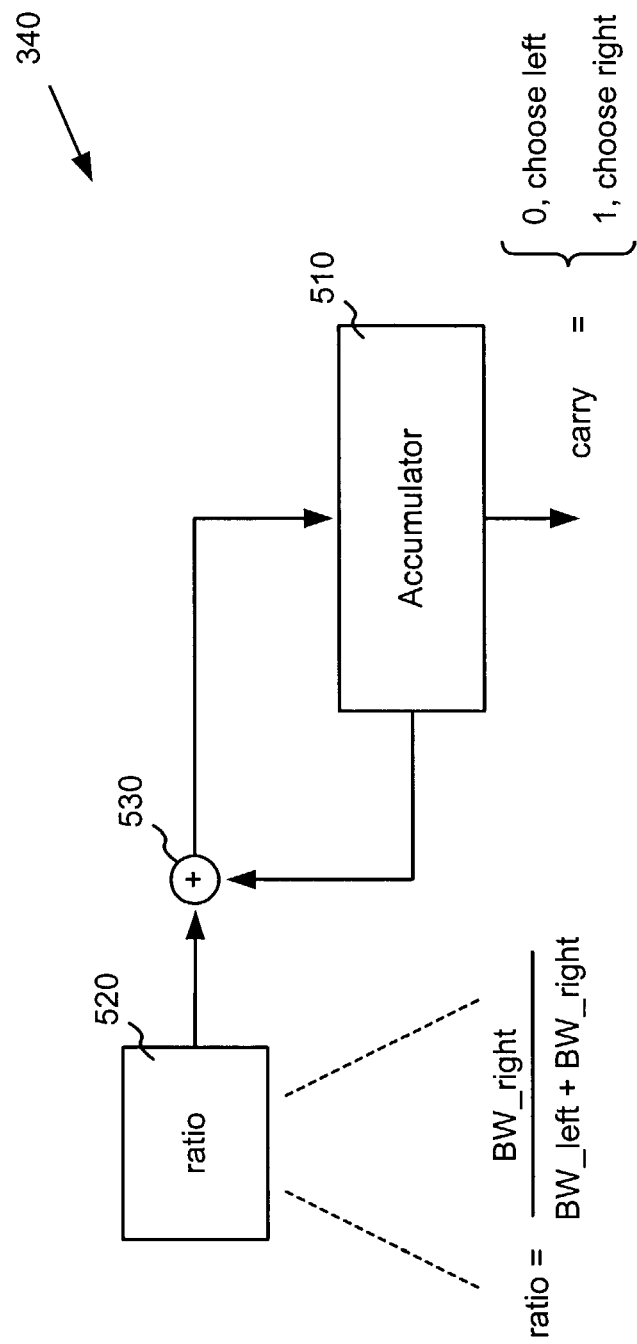
FIG. 5 is a detailed diagram of arbiter logic in the arbiter system of FIG. 3.

FIG. 5 is a diagram illustrating arbiter logic 340 in greater detail. Arbiter logic 340 may include an accumulator 510, a ratio storage element 520, and an addition element 530. Accumulator 510 may be configured to store a value and to output a carry signal when the stored value exceeds a threshold. For example, the threshold for accumulator 510 may be 1.0. When an input value meets or exceeds this amount, only the decimal portion may be stored, and the carry signal may indicate that the threshold has been reached. For example, a value of 1.5 input into accumulator 510 may result in the stored value being 0.5 and a carry signal having a logical value of 1. The carry signal corresponds to the control signal output by arbiter 340 in FIG. 3. Other thresholds may be used.

Ratio storage element 520 may be configured to store a ratio value. As shown in FIG. 5, the ratio value may equal the bandwidth associated with right arbiter 320 (i.e., BW_right) divided by the sum of the bandwidths associated with left arbiter 310 and right arbiter 320 (i.e., BW_left+BW_right). This ratio value is typically fixed for a period of time, and may be programmed into ratio storage element 520 for ease of modification if the bandwidths associated with arbiters 310 and 320 change.

Addition element 530 may be configured to add the ratio value from ratio storage element 520 to the stored value in accumulator 510. This addition may occur periodically (e.g., every T clock cycles) as mentioned previously.

In operation, elements 510-530 serve to control MUX 330 to choose between the outputs of left arbiter 310 and right arbiter 320 via the carry signal in proportion to the ratio value stored in ratio storage element 520. For example, if BW_right=3*(BW_left), the ratio value is 0.75. Upon successive additions, the {accumulator value, carry} states would be a repeating series of {0.5, 1}; {0.25, {0, 1}; and {0.75, 0}. Because a carry value of 1 chooses the output of right arbiter 320, this arbiter's output is chosen three times more often than the output of left arbiter 310, which corresponds to a carry value of 0. Hence, arbiter logic 340 in FIG. 5 may perform weighted arbitration among the outputs of arbiters 310 and 320 based on the programmable ratio value.

Those skilled in the art will appreciate that a modified ratio of BW_left/(BW_left+BW_right) would produce the same weighted arbitration results if a carry value of 1 chooses the output of left arbiter 310 and a carry value of 0 chooses the output of right arbiter 320. Continuing the above example where BW_right=3*(BW_left), the modified ratio would be 0.25. Upon successive additions, the {accumulator value, carry} states would be a repeating series of {0, 1}; {0.25, 0}; {0.5, 0}; and {0.75, 0}. This scheme would also result in the output of right arbiter 320 being chosen three times more often.

Returning to FIG. 3, those skilled in the art will appreciate that left arbiter 310 and right arbiter 320 need not be single arbiters, but may be arbiter systems similar to arbiter system 300. Using multiple arbiters within left arbiter 310 or right arbiter 320 may produce a multiple-level (e.g., hierarchical) arbiter, one example of which will be described below.

Exemplary Multi-Level Arbiter System

Figure 6:
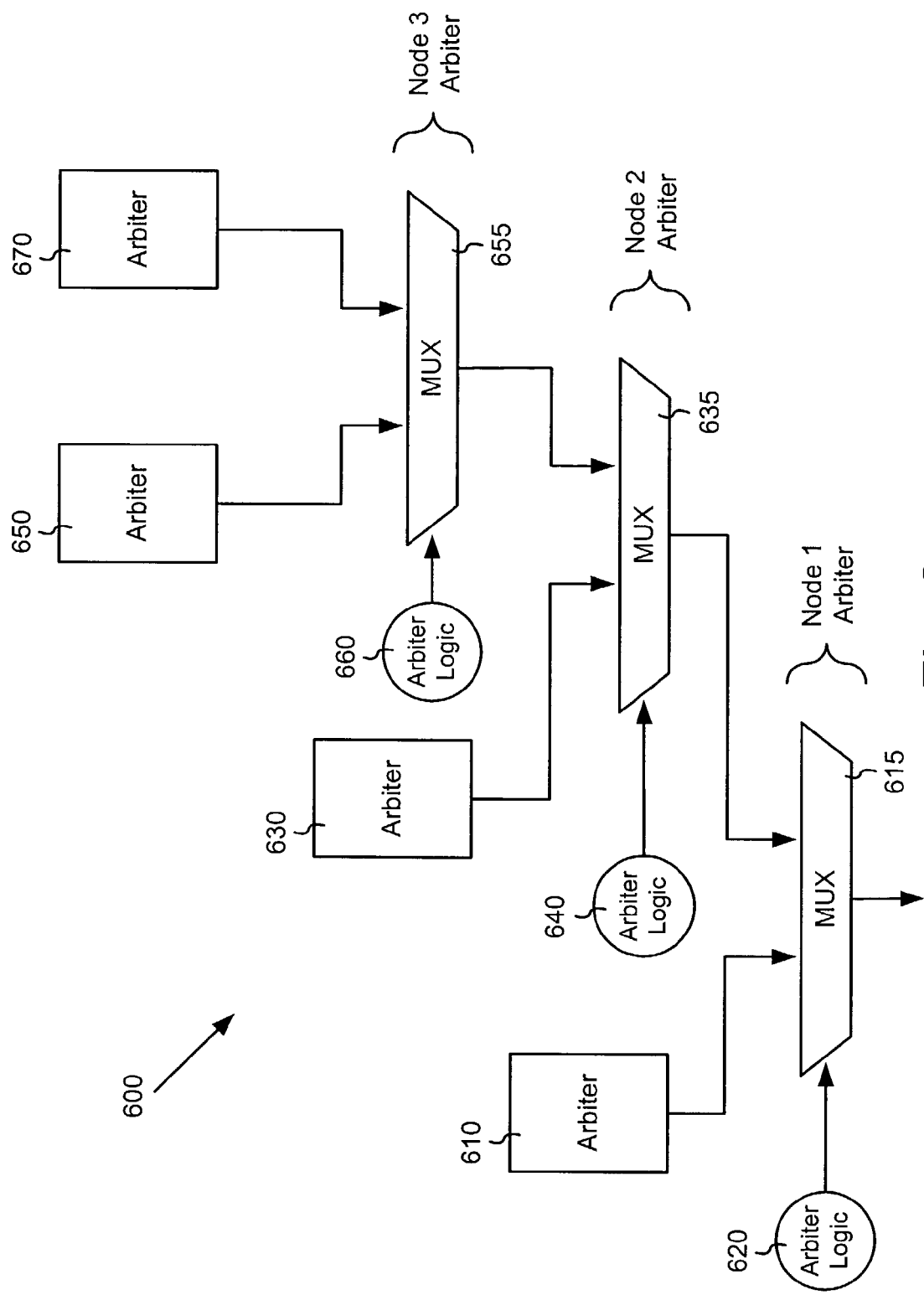
FIG. 6 is a diagram illustrating a multi-level arbiter system consistent with the principles of the invention.

FIG. 6 is a diagram illustrating a multi-level arbiter system 600 consistent with the principles of the invention. Multi-level arbiter system 600 may be one implementation of arbiter 220 in FIG. 2. Multi-level arbiter system 600 may include a first arbiter 610, a first multiplexer 615, first arbiter logic 620, a second arbiter 630, a second multiplexer 635, second arbiter logic 640, a third arbiter 650, a third multiplexer 655, third arbiter logic 660, and a fourth arbiter 670. Arbiters 610/630/650/670, multiplexers 615/635/655, and arbiter logic 620/640/660 may be similar in structure and function to arbiters 310/320, multiplexer 330, and arbiter logic 340, so only the differences will be described in greater detail below.

For ease of reference, the label "Node 1 arbiter" may be associated with first multiplexer 615 and first arbiter logic 620; "Node 2 arbiter" may be associated with second multiplexer 635 and second arbiter logic 640; and "Node 3 arbiter" may be associated with third multiplexer 655 and third arbiter logic 660. Viewed in this manner, third arbiter 650 and fourth arbiter 670 are respectively the "left" and "right" arbiters of the Node 3 arbiter. Similarly, second arbiter 630 and the Node 3 arbiter are respectively the "left" and "right" arbiters of the Node 2 arbiter. First arbiter 610 and the Node 2 arbiter are respectively the "left" and "right" arbiters of the Node 1 arbiter.

First arbiter 610, second arbiter 630, third arbiter 650, and fourth arbiter 670 may collectively hold requestor IDs corresponding to four (possibly) different bandwidths. Similar to arbiter system 300, each of arbiter logics 620/640/660 use a ratio to determine which of their left or right multiplexer inputs to output. In multi-level arbiter system 600, however, the left bandwidth BW_left used in the ratio for a node is the sum of all associated bandwidths on the left side of the node, and right bandwidth BW_right used in the ratio for a node is the sum of all associated bandwidths on the right side of the node.

For example, the bandwidths associated with first arbiter 610, second arbiter 630, third arbiter 650, and fourth arbiter 670 may be BW_1, BW_2, BW_3, and BW_4, respectively. For the Node 3 arbiter, BW_left equals BW_3, and BW_right equals BW_4. For the Node 2 arbiter, BW_left equals BW_2, and BW_right equals (BW_3+BW_4). Similarly, for the Node 1 arbiter, BW_left equals BW_1, and BW_right equals (BW_2+BW_3+BW_4).

Continuing the above example with numerical values, the relatively straightforward case where the associated bandwidths of first through fourth arbiters 610/630/650/670 are equal will be examined. Using the ratio formula from FIG. 5 (i.e., ratio=(BW_right/(BW_left+BW_right)), the ratio for the Node 3 arbiter is 1/(1+1)=0.5. Thus, arbiter logic 660 will choose the outputs of third arbiter 650 and fourth arbiter 670 with equal frequency. The ratio for the Node 2 arbiter is 2/(1+2)=0.667. Thus, arbiter logic 640 will choose the output of Node 3 arbiter (i.e., multiplexer 655) twice as often as it will choose the output of second arbiter 630. Such a ratio results in multiplexer 635 of Node 2 arbiter outputting the outputs of arbiters 630, 650, and 670 with equal frequency. Finally, the ratio for the Node 1 arbiter is 3/(1+3)=0.75. Arbiter logic 620 will choose the output of Node 2 (i.e., multiplexer 635) three times as often as it will choose the output of first arbiter 610. Hence, multiplexer 615 of Node 1 will output the requestor IDs from arbiters 610, 630, 650, and 670 with equal frequency, as would be expected with all arbiters having an equal bandwidth.

One final example illustrating unequal bandwidths is where BW_4=4*BW_1; BW_3=3*BW_1; and BW_2=2*BW_1. With such unequal bandwidths, the ratio for arbiter logic 660 in the Node 3 arbiter is 4/(3+4)=0.571. The ratio for arbiter logic 640 in the Node 2 arbiter is 7/(2+7)=0.778. The ratio for arbiter logic 620 in the Node 1 arbiter is 9/(1+9)=0.9. Such ratios in arbiter logics 620/640/660 cause multiplexer 615 in Node 1 to output requestor IDs from respective first through fourth arbiters 610, 630, 650, and 670 in a frequency ratio of 1:2:3:4, respectively. For example, for every one requestor ID from the arbiter 610, the Node 1 arbiter would output nine requestor IDs from the other arbiters 630, 650, and 670 as their respective bandwidths would indicate.

In another implementation consistent with the principles of the invention, the left bandwidth BW_left used in the ratio for a node may be the total of all requester bandwidths on the left side of the node, and right bandwidth BW_right used in the ratio for a node may be the total of all requester bandwidths on the right side of the node. Unlike the above implementation, the number of requesters in each arbiter may affect the calculated ratios in this "total bandwidth" implementation.

For example, as stated above the bandwidths associated with first arbiter 610, second arbiter 630, third arbiter 650, and fourth arbiter 670 may be BW_1, BW_2, BW_3, and BW_4, respectively. Further, the number of requestors in the first arbiter 610, second arbiter 630, third arbiter 650, and fourth arbiter 670 may be N_1, N_2, N_3, and N_4, respectively. For the Node 3 arbiter, BW_left equals N_3*BW_3, and BW_right equals N_4*BW_4. For the Node 2 arbiter, BW_left equals N_2*BW_2, and BW_right equals (N_3*BW_3+N_4*BW_4). Similarly, for the Node 1 arbiter, BW_left equals N_1*BW_1, and BW_right equals (N_2*BW_2+N_3*BW_3+N_4*BW_4).

Exemplary Arbiter Processing

Figure 7:
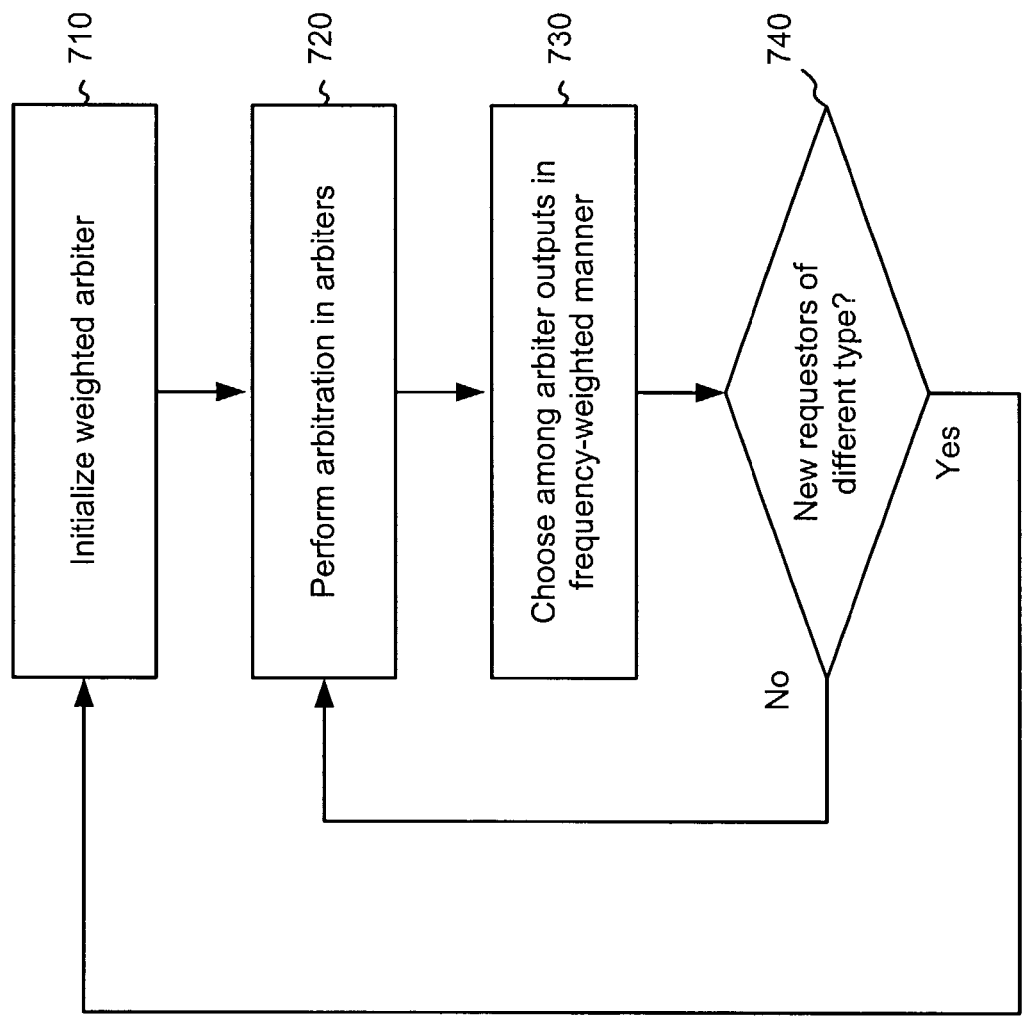
FIG. 7 is a flow chart illustrating operation of an arbiter system consistent with the principles of the invention.

FIG. 7 is a flow chart illustrating operation of an arbiter system (e.g., 300, 600) consistent with the principles of the invention. Although the acts in FIG. 7 will be described primarily with respect to arbiter system 300 of FIG. 3, reference may be made to multi-level arbiter 600 in FIG. 6 to illustrate processing differences in the multi-level case.

Processing may begin by initializing a weighted arbiter (e.g., arbiter system 300 or multi-level arbiter 600) [act 710]. Such initialization may entail all acts necessary prior to the arbiter beginning operation. Such initialization acts may include grouping requesters according to bandwidth.

Figure 8:
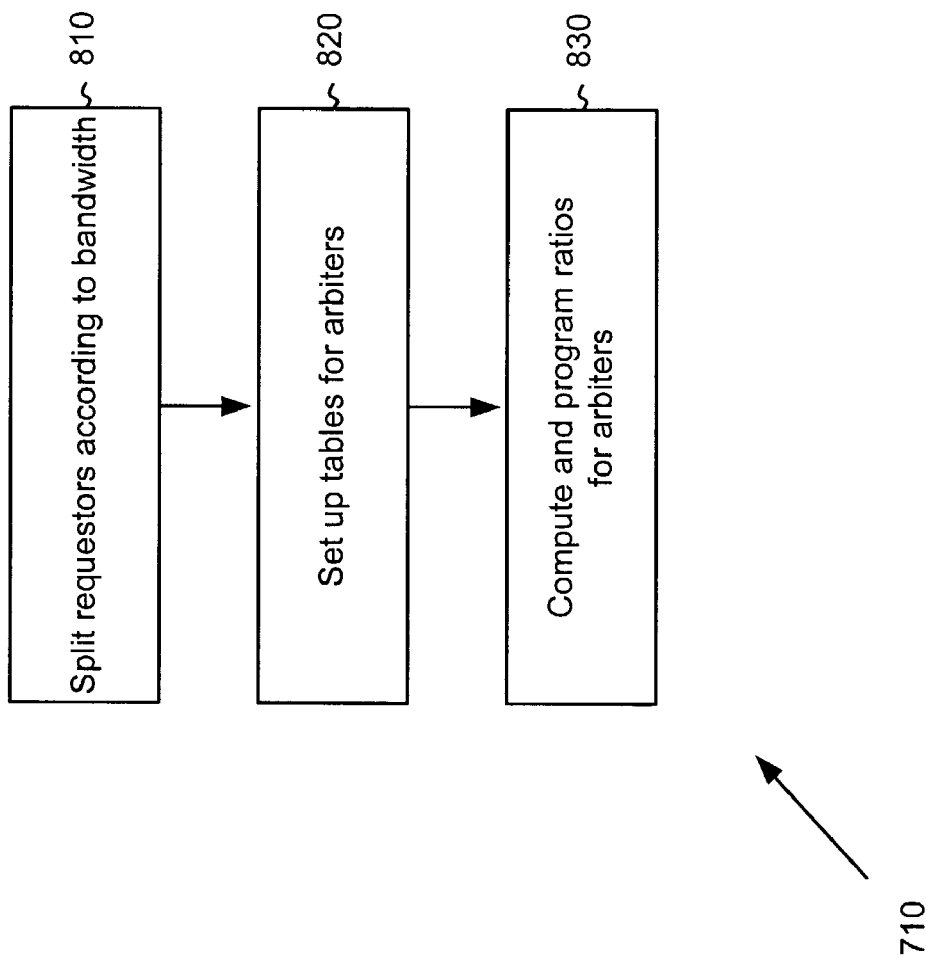
FIG. 8 is a flow chart illustrating one implementation of the initialization act of FIG. 7 in greater detail.

FIG. 8 is a flow chart illustrating one implementation of the initialization act 710 in greater detail. Initialization may begin with arbiter logic 340 (or other processing circuitry) grouping requestors according to their respective bandwidth [act 810]. All requestors (e.g., cell identifiers) that share a common bandwidth may be grouped together.

Using these groups of requesters, storage elements 410 (e.g., tables) and pointers 420 may be established in a memory device for each of the groups [act 820]. The number of requestors in a group may determine the size of storage element 410 needed for that group, as well as the range between the start and finish pointers 420. The current pointer may be initially set to the start pointer's value, but other initial values may be chosen. Such organizing may establish a number of arbiters (e.g., 310, 320, 610, 630, etc.) corresponding to the different groups of requesters. These arbiters may be grouped, for example, in a hierarchical manner as shown in FIGS. 3 and 6.

Processing may continue by computing and storing bandwidth ratios corresponding to arbiter logics [act 830]. For example, with respect to FIG. 6, three ratio values may be computed and respectively stored in arbiter logics 620, 640, and 660. These ratio values may be programmable (i.e., dynamically changeable), so that the arbiter system (e.g., 300 or 600) may be easily modified if requesters having a new bandwidth are added. The ratio values may be stored in ratio storage elements, such as element 520. Such computing and storing of ratios in act 830 may complete the initialization of arbiter system 300/600.

Returning to FIG. 7, arbitration may be performed in the arbiters (e.g., 310, 320) of the arbiter system to produce a number of outputs [act 720]. For round-robin arbiters of the type shown in FIG. 4, act 720 may consist of outputting the requestor (or requestor ID) at the location of the current pointer. In other arbiter implementations, however, act 720 may entail further operations to produce outputs from the arbiters.

Arbiter logic (e.g., 340) may choose among the arbiter outputs in a frequency-weighted manner [act 730]. In arbiter system 300, act 730 may involve choosing one of the two outputs from arbiters 310 and 320. In multi-level arbiter system 600, however, act 730 may involve decisions between various outputs by arbiter logics 620, 640, and 660.

Figure 9:
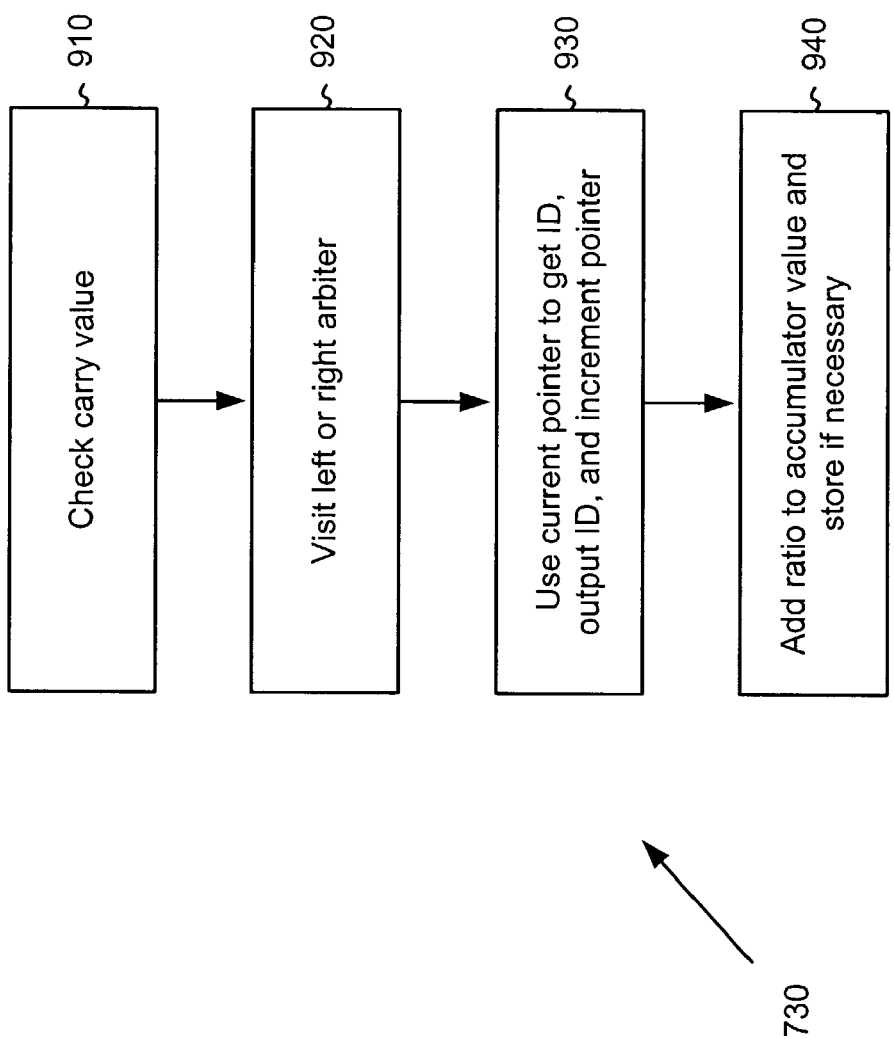
FIG. 9 is a flow chart illustrating one implementation of the weighted arbitration act of FIG. 7 in greater detail.

FIG. 9 is a flow chart illustrating one implementation of the weighted arbitration act 730 in greater detail. Processing may begin with arbiter logic 340 checking the state of its carry bit [act 910]. Depending on the state of the carry bit, arbiter logic 340 may select an output from one of its left arbiter 310 or its right arbiter 320 [act 920]. For example, if the carry bit is zero, arbiter logic 340 may select/visit left arbiter 310; and if the carry bit is one, the arbiter logic 340 may select/visit right arbiter 320.

Arbiter logic 340 may use the current pointer in, for example, left arbiter 310 to obtain the corresponding requestor ID, and may output that requestor ID [act 930]. Arbiter logic 340 may also "clock" or otherwise trigger the selected arbiter to choose another requestor ID to replace the requestor ID that was output. In FIG. 4, for example, arbiter logic 340 may cause the current pointer to be incremented.

Arbiter logic 340 may update the value in accumulator 510 by adding the stored ratio to the existing accumulator value [act 940]. This updating of the accumulator value may result in weighting a frequency at which the output of a particular arbiter (e.g., 310) is chosen. For multi-level arbiter systems (e.g., 600), act 940 may update only the accumulator values in the arbiter logics that chose the final requester. For example, if the final requestor was chosen from arbiter 630, then the accumulator values in arbiter logics 620 and 640 would be updated, but the corresponding value in arbiter logic 660 would not be updated. Similarly, if the final requestor came from either of arbiters 650 or 670, the accumulator values in all of arbiter logics 620, 640, and 660 would be updated.

Returning to FIG. 7, arbiter system 300/600 may determine whether any new requestors have been added that are associated with a different bandwidth from existing requesters [act 740]. If no new requesters are present, acts 720 and 730 may be repeated (possibly at periodic intervals) to choose the next final requestor to be output by the arbiter system. Similarly, if new requesters are present that have the same associated bandwidth as other existing requesters, these new requesters may be added to the existing arbiter (e.g., 310) associated with the same bandwidth. Acts 720 and 730 may be repeated with the new requesters appended to one or more existing arbiters.

If new requesters are associated with a different bandwidth than the current group of bandwidths, then arbiter system 300/600 may be re-initialized in act 710. This initialization 710 may add another arbiter for the new requestors, and may re-compute and change stored ratios in arbiter logics 340/620/etc. to reflect the addition of this new bandwidth. Those skilled in the art will appreciate that programmable ratio values may facilitate rapid and automatic configuration of arbiter system 300/600 when requesters associated with a new bandwidth are added or when all requesters associated with an existing bandwidth are removed.

CONCLUSION

As described above, weighted arbitration may be performed on different groups of requestors corresponding to different bandwidths. Arbiter system 300/600 may service requesters from the different groups with frequencies that are proportional to the bandwidths associated with the different groups. For example, requesters from a group having double the bandwidth of another group may be serviced twice as often as requesters from the other group.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while series of acts have been presented with respect to FIGS. 7-9, the order of the acts may be different in other implementations consistent with principles of the invention. Additionally, lines with arrows are used in the figures to generally illustrate the flow of data. In practice, embodiments consistent with the principles of the invention may send data on these lines in both directions.

Although the principles of the invention have been described with respect to groups of requesters associated with multiple bandwidths, the invention herein is equally applicable to frequency-weighted arbitration based on a requestor characteristic other than bandwidth. For example, priority levels (e.g., high, medium, low, etc.) may be used to group requestors together, and predetermined ratios between priority levels may be used for weighted round-robin arbitration among the groups. Those skilled in the art will appreciate that programmable ratios, and the arbiter system structure described herein, may be used with requester characteristics other than bandwidth.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method, performed by a processing device, for performing weighted arbitration, comprising:
    grouping, by the processing device, requesters into a plurality of groups of requesters so that each group of requesters is associated with a different bandwidth, where grouping the requesters includes:
        computing and storing at least one ratio for at least two of the groups of requesters based on the different bandwidths;
    selecting, by the processing device, a requester from each of the groups of requesters to produce a plurality of selected requesters; and
    periodically choosing, by the processing device, a final requester from the plurality of selected requestors so that the final requestor is chosen from each of the groups of requesters with a frequency that is proportional to the respective different bandwidth associated with each of the groups of requesters, where periodically choosing the final requester includes selecting the final requestor using the at least one ratio.

2. The method of claim 1, where the selecting includes:
    selecting the requester from each of the groups of requesters in a round robin manner within each of the groups of requesters.

3. A device comprising:
    means for performing round robin arbitration among a first group of requesters to produce a first output, the first group being associated with a first bandwidth;
    means for performing round robin arbitration among a second group of requesters to produce a second output, the second group being associated with a second bandwidth; and
    means for selecting the first output at a rate corresponding to the first bandwidth divided by a sum of the first bandwidth and the second bandwidth.

4. The device of claim 3, where the means for selecting further includes:
    means for selecting the second output at another rate corresponding to the second bandwidth divided by a sum of the first bandwidth and the second bandwidth.

5. A device comprising:
    means for grouping requesters into a plurality of groups of requesters so that each group of requesters is associated with a different bandwidth, where the means for grouping the requesters includes:
        means for computing and storing at least one ratio for at least two of the groups of requesters based on the different bandwidths;
    means for selecting a requester from each of the groups of requesters to produce a plurality of selected requesters; and
    means for periodically choosing a final requester from the plurality of selected requesters so that the final requester is chosen from each of the groups of requesters with a frequency that is proportional to the respective different bandwidth associated with each of the groups of requesters, where the means for periodically choosing the final requester includes means for selecting the final requestor using the at least one ratio.

6. The device of claim 5, further comprising:

means for selecting the requester from each of the groups of requestors in a round robin manner within each of the groups of requesters.

7. A method, comprising:

performing, by a processing device, round robin arbitration among a first group of requesters to produce a first output, the first group being associated with a first bandwidth;

performing, by a processing device, round robin arbitration among a second group of requesters to produce a second output, the second group being associated with a second bandwidth; and selecting, by a processing device, the first output at a rate corresponding to the first bandwidth divided by a sum of the first bandwidth and the second bandwidth.

8. The method of claim 7, further comprising:

selecting the second output at another rate corresponding to the second bandwidth divided by a sum of the first bandwidth and the second bandwidth.

9. A system, comprising:

a first arbiter to:

perform round robin arbitration among a first group of requestors to produce a first output, the first group being associated with a first bandwidth;

a second arbiter to:

perform round robin arbitration among a second group of requestors to produce a second output, the second group being associated with a second bandwidth; and arbiter logic to:

select the first output at a rate corresponding to the first bandwidth divided by a sum of the first bandwidth and the second bandwidth.

10. The system of claim 9, where the arbiter logic is further to:

select the second output at another rate corresponding to the second bandwidth divided by a sum of the first bandwidth and the second bandwidth.

\* \* \* \* \*

UNITED STATES PATENT AND TRADEMARK OFFICE
CERTIFICATE OF CORRECTION

PATENT NO. : 7,710,996 B1  Page 1 of 1
APPLICATION NO. : 10/227835
DATED : May 4, 2010
INVENTOR(S) : Ravi K. Damaraju et al.

It is certified that error appears in the above-identified patent and that said Letters Patent is hereby corrected as shown below:

Column 10, claim 1, line 16 should spell: "rality of groups of requestors so that each group of"
Column 10, claim 1, line 20 should spell: "of the groups of requestors based on the different"
Column 10, claim 1, lines 22-24 should spell: "selecting, by the processing device, a requestor from each of the groups of requestors to produce a plurality of selected requestors; and"
Column 10, claim 1, line 26 should spell: "requestor from the plurality of selected requestors so that"
Column 10, claim 1, line 28 should spell: "requestors with a frequency that is proportional to the"
Column 10, claim 1, line 31 should spell: "the final requestor includes selecting the final requestor"
Column 10, claim 2, lines 34-36 should spell: "selecting the requestor from each of the groups of requestors in a round robin manner within each of the groups of requestors"
Column 10, claim 5, lines 54-57 should spell: "means for grouping requestors into a plurality of groups of requestors so that each group of requestors is associated with a different bandwidth, where the means for grouping the requestors includes:"
Column 10, claim 5, lines 61-62 should spell: "means for selecting a requestor from each of the groups of requestors to produce a plurality of selected requestors;"
Column 10, claim 5, lines 65-66 should spell: "plurality of selected requestors so that the final requestor is chosen from each of the groups of requestors with a"
Column 11, claim 5, lines 1-3 should spell: "bandwidth associated with each of the groups of requestors, where the means for periodically choosing the final requestor includes means for selecting the final"
Column 11, claim 6, line 6 should spell: "means for selecting the requestor from each of the groups"
Column 11, claim 6, line 8 should spell: "groups of requestors."
Column 11, claim 7, line 11 should spell: "among a first group of requestors to produce a first out-"
Column 11, claim 7, line 15 should spell: "among a second group of requestors to produce a second"

Signed and Sealed this

Twenty-second Day of June, 2010

David J. Kappos
*Director of the United States Patent and Trademark Office*